Patented Oct. 6, 1953

2,654,681

UNITED STATES PATENT OFFICE 2,654,681

MAGNETIC RECORDING TAPE

Laurence B. Lueck, St. Paul, Minn., assignor to Minnesota Mining & Manufacturing Company, St. Paul, Minn., a corporation of Delaware No Drawing. Application January 27, 1950, Serial No. 140,953

3 Claims. (Cl. 117—161)

The present invention relates to magnetic recording sheet material, particularly in the form of narrow tape for the storage of signals as magnetic impulses.

Magnetic recording sheet material commonly consists of finely divided magnetic powder distributed in a plastic binder and coated on a thin flexible supporting web. Early types employed iron oxide particles dispersed in nitrocellulose lacquer binder and coated on thin paper. More recent modifications employ various improved polymeric binders, preferably with cellulose acetate or other non-fibrous film supports. The coated sheet is cut into narrow continuous strips and wound on reels.

For recording and reproducing signals, the tape is pulled past fixed magnetic heads by means of constant-speed capstans or similar devices. It is essential that the magnetizable particles of the tape coating come into close proximity with the magnetic heads, since the available magnetic forces are quite small. Hence the tape is ordinarily under considerable tension as it passes across the magnetic gap, and presses firmly against the head. With tape constructions hitherto available, these conditions have resulted in high frictional forces between the tape and the head, and have given rise to "squeal" and "modulation noise" in the reproduced signal.

Covering the magnetic heads with friction-reducing material is impractical, due to the constant wear occurring at such points and to the required close dimensional tolerances. Lubrication of the tape surface with lubricating oils, waxes, etc., is found to provide only moderate and temporary relief, and such materials soften the usual binder compositions so that they are soon badly abraded. Even slight abrasion must be avoided, since the magnetic material removed from the tape has a tendency to collect at the magnetic head and interfere with proper operation of the circuit.

The frictional force developed between tape and magnetic head may be accurately determined by means of a simple testing device in which the tape is pulled under specified tension past a fixed head of defined shape and materials, and the pull is measured on a spring balance.

Such a testing device is constructed and operated as follows. A cleaned and polished flat "Mu" metal strip ¼ inch wide and 1 inch long is cemented or otherwise secured in the bottom of a ¼ inch channel cut in a 1-inch wide block of metal or plastic, the block serving merely as a support for the metal strip and a guide for the tape. The block is anchored to a table-top or other surface. The tape sample, of 12 inches or greater length and ¼ inch width, is fastened to a spring scale and laid in the groove with the magnetic coated surface contacting the metal strip. Pressure is applied over the area of the metal strip by means of a felt pad backed up with a flat-surface brass bar fitting within the channel and weighted to 50 grams, the bar being held in place in the channel by a suitable hinge or strap. The tape is then drawn through the channel, between the polished metal friction strip and the felt-covered weight, by pulling on the spring scale, and the pull required is recorded. The rate of travel is just sufficient to provide smooth sustained motion of the tape across the strip. Average readings for ten or more tests are taken, the tests being made at normal room temperature.

"Mu" metal is an alloy of about 75% nickel, 20% iron, and small amounts of copper, chromium, molybdenum, etc., having high magnetic permeability. This type of material is widely used for the laminations of the magnetic heads in magnetic recording devices, hence the results obtained in this test are directly comparable to those obtained when the tape is employed in magnetic recording.

It has been observed that magnetic recording tapes which show a frictional pull of more than about 30 grams in the above test, and particularly those showing a frictional pull of as high as 50–70 grams, produce squeal and modulation noise, whereas the tapes of this invention, showing a frictional pull of less than about 30 grams, and in many cases of less than about 25 grams, are completely free of such effects when used with any of the magnetic recorder devices now available.

It is therefore an object of the present invention to provide a magnetic recording tape having low frictional drag. Another object is to provide a magnetic recording tape having a high degree of abrasion resistance. A further object is to provide a magnetic recording tape having low friction and high abrasion resistance and retaining these properties over long periods of storage and many cycles of use. A specific object is to provide a magnetic recording tape in which the frictional pull, measured as herein defined, is less than about 30 grams, and preferably less than about 25 but not lower than about 10–15 grams. Other objects will be made apparent as the description of the invention proceeds.

It has now been found that the addition of certain high molecular weight silicones in small proportion to the mixture of binder and magnetic particles effectively and permanently reduces the frictional pull of the corresponding coated magnetic recording tape and accomplishes the various objects enumerated. The effect is found to be obtained irrespective of the particular binder composition or support web, as will be apparent from the following specific examples.

EXAMPLE 1

Thin cellulose acetate film having a caliper of 0.0014–0.0016 inch and a lengthwise tensile strength of 15–20 lbs. per inch width with an elongation of less than 12% at break was selected as the support. It was coated with a uniform dispersion of two parts of acicular magnetic red iron oxide powder in one part of a binder consisting essentially of the copolymer of 45 parts of ethyl acrylate and 55 parts of methyl methacrylate, and dissolved in a mixture of toluene and acetone, the dispersion containing also 1.3 parts of a high molecular weight polymeric dimethylsilicone, in this case Dow-Corning "Anti-Foam A," a semisolid, translucent plastic silicone polymer, for each 100 parts of magnetic oxide. The silicone was only partially soluble in the solvent mixture, but was uniformly dispersed by prolonged mixing.

Without the added silicone, such a tape had a frictional pull greatly in excess of 30 grams, and usually averaging 70–80 grams. The tape of the example, on the other hand, had a frictional pull of less than 25 grams, the average being 22 grams. Doubling the amount of silicone still further reduced this figure to 10–20 grams. The effect was permanent, the values remaining approximately the same even after prolonged storage and after numerous cycles of unwind and rewind through a commercial magnetic recorder unit.

EXAMPLE 2

A film as used in Example 1 was employed as the support. The binder consisted of a copolymer of equal parts of n-butyl acrylate and methyl methacrylate. A black acicular magnetic iron oxide powder was uniformly dispersed in a solution of the binder in toluol containing a small amount of acetone. At the same time, the polymeric silicone of Example 1 was mixed into the batch, the amount of silicone being 1.3% of the weight of the magnetic oxide. The smooth dried coating of this dispersion on the acetate film weighed 6–7 grains per 24 square inches.

The frictional force of the tape of this example was found to be between 15 and 30 grams. With double the amount of silicone, the pull was more uniform and remained at 15 grams. Frictional forces of 50–65 grams were obtained when the silicone was omitted; at these values, vibrations were set up in the tape during recording, which later showed up as squeals and modulation noise on playback.

For coatings made on treated paper backings in place of the cellulose acetate film, it was found desirable to use the higher ratio of silicone polymer, viz., about 2.6% on the weight of the magnetic oxide.

EXAMPLE 3

To make the binder for this example, four parts of a stabilized copolymer of vinyl chloride (90 parts) and vinyl acetate (10 parts) were blended with one part of freshly milled rubbery copolymer of butadiene (65 parts) and acrylonitrile (35 parts), in solution in methyl isobutyl ketone. Magnetic iron oxide powder, in this case a material having chunky, non-acicular particles, was added, together with a small amount of "Anti-Foam A" silicone polymer, and the mixture was coated on cellulose acetate film, as in Example 1, to produce a high quality magnetic recording tape having reduced frictional pull. Without the silicone polymer, the pull was at least about 45 grams, and often as high as 65 grams; at 0.60% silicone (based on the oxide weight), the pull was only 16 grams. At 1.3% and at 2.6%, values of 11 and of 6–10 grams respectively were obtained.

Since the silicone polymer is expensive, it is obviously desirable to use it in minimum amounts. In extremely small proportions, however, uniform distribution of the silicone in the coating is sometimes difficult to secure, and erratic results are obtained. About 0.5 to 1.5% of "Anti-Foam A" silicone polymer is generally effective, while up to about 2.0–2.5% or even slightly higher has given good results. Some slight variations in these percentages may be desirable, e. g. when substituting other generally equivalent polymeric silicones for the "Anti-Foam A," but in general the amount of silicone should represent approximately 0.5–2.5% of the weight of the magnetic iron oxide.

Thin paper, such as thin rope-fiber tissue paper ("flexrope"), preferably previously impregnated with plasticized vinyl chloride:vinyl acetate copolymer, has provided a suitable support web for the magnetic recording tape of this invention in place of the cellulose acetate film. The impregnating composition, and the treated web, may be pigmented or otherwise given an identifying appearance. The impregnated paper backed strip has somewhat higher frictional pull, for a given percentage of silicone, than the film backed tape, hence requires slightly more of the silicone for equivalent results.

The support web, whether fibrous or non-fibrous, may be given a preliminary adhesive priming coat so as to provide improved adhesive anchorage between the support and the magnetic layer.

The magnetic layer will ordinarily contain about two parts of magnetic iron oxide (or an equivalent amount of other magnetic powder material) to about one part of binder. Larger amounts of oxide reduce the effectiveness of the bond; smaller amounts of oxide provide insufficient magnetic force for best retention and reproduction of impressed signals. Small changes in these proportions have no significant effect on the frictional pull of my improved tape product.

Coating of the magnetic mixture may be accomplished by means of spreader bars, coating rolls or knives, intaglio printing, or in any other convenient manner. The finished coating must be thick enough to provide adequate magnetic force, and must be smooth and uniform. Smoothing operations, such as calendering of the coated and dried sheet, are sometimes helpful in obtaining improved quality recording and reproduction.

With some types of coating operations, multiple coats are advantageous. In such cases, only the outer layer need contain the silicone polymer. However, it is found that superior results are obtained by incorporating the silicone within the coating composition rather than by applying the silicone to the exterior surface of the coated and dried magnetic layer. This is particularly true with respect to the permanence of the effect produced. Where multiple-layer coatings are applied, the total amount of silicone may be somewhat reduced, but the amount in the outer layer should be somewhat greater than would be required where the mixture was to be applied as a single coating.

The surprising effectiveness of the silicone polymers in permanently reducing the frictional pull of magnetic recording tapes is shown by the values given in the accompanying table. Tape A is similar to that of Example 1, comprising a polyacrylate binder and iron oxide powder coated on acetate film, and contains 1.3% of "Anti-Foam A" silicone. Tape B is otherwise identical with tape A, but contains no silicone. Tape C is prepared from tape B by applying to the magnetic coating, from dilute solution in heptane, a thin surface layer of paraffin oil. Tape D is similar, except that carnauba wax is substituted for the paraffin oil. The tapes were tested in their original condition, and also after holding in storage at 150° F. (aging test) and after 500 cycles over a hot mandrel (simulated playback test). The 150° F. temperature corresponds closely to the temperature attained in the erase head during operation of many commercial magnetic recording machines. Tapes A and B were aged for 24 hours; tapes C and D, for only 7 hours.

*Frictional pull of magnetic tapes, grams*

| Tape | A | B | C | D |
|---|---|---|---|---|
| Treatment | silicone | untreated | oil | wax. |
| Original condition...grams | 25 | 65 | 38 | 45. |
| 150° Aging...do | 25 | 65 | 70 | 65. |
| 500 cycle playback...do | 30 | over 100 | | over 100. |

When small amounts of oil or wax were mixed with the coating composition prior to coating, no measurable reduction in frictional pull was obtained. Large amounts of these materials softened the coating and drastically reduced the effectiveness of the binder.

The tapes were also used for recording and reproducing music and voice. Tape A unwound smoothly from the reel, caused no visible wear of the magnetic heads even on long-continued operation, and provided excellent performance as a magnetic recording medium. Tape B showed a tendency to stick in the reel, particularly after storage at moderately elevated temperatures. It caused observable wear after prolonged operation, and deposited small amounts of binder and magnetic powder on the magnetic heads. The high frictional pull over the heads resulted in squealing and modulation noise. Tapes C and D were somewhat lower in frictional pull than the untreated tape when first tested, but as the test continued the pull increased until noticeable squealing was again encountered. The coating of tape C was found, after the aging test, to be softer than that of tape B. Tape D deposited accumulations of wax on the magnetic heads.

The silicones have been defined as polymeric organosiloxanes in which the polymeric chains are composed of alternate silicon and oxygen atoms and the side chains, attached to silicon, are hydrocarbon radicals. Long-chain or high molecular weight liquid or plastic polymeric silicones such as the polymeric dimethyl silicone of the foregoing specific examples consisting of at least about ten monomeric units and in which the side chains are predominantly methyl groups, come within this classification and are found to be generally suitable for the purposes of this invention. Thus, I have obtained good results with a number of such silicone polymers, and which are obtainable, at the date of the filing of this application, under the designations "DC-200," "DC-550," "GE-81069" and "GE-81066." These silicones, which are considered as being fully equivalent to the DC "Anti-Foam A" for the purposes of my invention, may be of various molecular weights; they may contain numerous cross-linkages; and a minor proportion of the methyl groups may be replaced by longer hydrocarbon radicals, e. g. ethyl, butyl, octyl, etc.

The specific dimethylsilicone polymer here identified as "Anti-Foam A," as well as the other equivalent high-polymer silicones, is insoluble, or at most only partially soluble, in the solvents customarily used for the application of the magnetic coatings of magnetic recording tape, and in addition appears to be incompatible with the polymeric binders. Such incompatibility may account for the lack of softening of the binder on addition of substantial quantities of the silicone, and also for the non-blocking characteristics of the tape. It might be expected that such soft and incompatible material would rapidly be expelled and exhausted from the magnetic layer during use of the tape. It might also be expected that coatings containing such incompatible additives would not form an effective bond with the surface of the support web when coated thereon. Suprisingly, however, the coating is found to be well bonded and the tape retains its initially low value of frictional pull and its other desirable properties even after prolonged storage in roll form and after practically innumerable use cycles.

What I claim is as follows:

1. Magnetic recording tape comprising a thin flexible non-magnetic support and firmly bonded thereto a magnetically susceptible coating and having a frictional pull as herein defined of not more than about 30 grams, said coating consisting mainly of a magnetic powder dispersed in a thermoplastic resinous polymeric binder and containing as a permanent friction-reducing component a high molecular weight liquid polymeric dimethylsilicone, said polymeric binder in the absence of said dimethylsilicone providing a tape product having a frictional pull substantially greater than 30 grams and giving rise to squeal and modulation noise in magnetically reproduced signals.

2. Magnetic recording tape comprising a thin flexible non-magnetic support and firmly bonded thereto a magnetically susceptible coating and having a frictional pull as herein defined of not more than about 30 grams, said coating consisting mainly of a magnetic iron oxide powder dispersed in a thermoplastic resinous polymeric binder and containing, as a permanent friction-reducing component, about ½–2½ parts of a high molecular weight liquid polymeric dimethylsilicone for each 100 parts of said iron oxide, and said binder in the absence of said dimethylsilicone providing a tape product having a frictional pull substantially greater than 30 grams and giving rise to squeal and modulation noise in magnetically reproduced signals.

3. Magnetic recording tape comprising a thin flexible non-magnetic support and firmly bonded thereto a magnetically susceptible coating and having a frictional pull as herein defined of about 10–25 grams, said coating consisting mainly of a magnetic iron oxide powder dispersed ing a thermoplastic resinous polymeric binder and containing, as a permanent friction-reducing component, about 1½ parts of a high molecular weight liquid polymeric dimethylsilicone for each 100 parts of said iron oxide, and said binder in the absence of said dimethylsilicone providing a tape product having a frictional pull substantially greater than 30 grams and giving rise to squeal and modulation noise in magnetically reproduced signals.

LAURENCE B. LUECK.

References Cited in the file of this patent

UNITED STATES PATENTS

| Number | Name | Date |
|---|---|---|
| 2,117,321 | Hill | Mar. 17, 1938 |
| 2,258,218 | Rochow | Oct. 7, 1941 |
| 2,357,348 | Netherly et al. | Sept. 5, 1944 |
| 2,384,384 | McGregor et al. | Sept. 4, 1945 |
| 2,389,491 | Dunlap et al. | Nov. 20, 1945 |
| 2,392,805 | Biefeld | Jan. 15, 1946 |
| 2,418,479 | Pratt et al. | Apr. 8, 1947 |
| 2,442,613 | Nicodemus | June 1, 1948 |
| 2,463,974 | Johannson | Mar. 8, 1949 |

FOREIGN PATENTS

| Number | Country | Date |
|---|---|---|
| 459,884 | Great Britain | Jan. 18, 1937 |
| 466,023 | Great Britain | May 18, 1937 |